Patented July 6, 1954

2,683,122

UNITED STATES PATENT OFFICE 2,683,122

PROCESS OF REGENERATING AN OXIDATION CATALYST COMPRISING OXIDES OF PHOSPHORUS AND MOLYBDENUM

Charles Albin Woodcock, Beckenham, David James Hadley, Epsom Downs, and David Ian Hutchinson Jacobs, Carshalton, England, assignors to The Distillers Company Limited, Edinburgh, Scotland, a British company No Drawing. Application February 23, 1951, Serial No. 212,493

Claims priority, application Great Britain March 10, 1950

3 Claims. (Cl. 252—412)

The present invention relates to an improved process for the regeneration of an oxidation catalyst comprising the oxides of phosphorus and molybdenum in combination.

In the copending application No. 199,146, filed December 4, 1950, now issued as Patent No. 2,649,477 is described a process for the manufacture of maleic acid wherein organic compounds containing 4 to 8 carbon atoms are oxidised in the vapour phase by means of an oxygen-containing gas in the presence of a catalyst comprising the oxides of phosphorus and molybdenum which may or may not be in chemical combination. The catalyst employed comprises a molybdenum oxide-phosphorus oxide complex, suitably supported on a carrier such as silica gel or alumina.

In the copending application No. 212,492, filed February 23, 1951, is described a process for the production of an improved oxidation catalyst which comprises contacting hydrated silica gel with an aqueous solution containing phosphate and molybdate ions, and thereafter drying the resulting mixture.

It has been found that when employing a catalyst comprising the oxides of phosphorus and molybdenum, which may or may not be in chemical combination, in the oxidation of organic compounds its activity becomes reduced after some time. An object of the present invention is to provide a simple, efficient process of the kind described for the regeneration of the catalyst. We have found that this used catalyst can be successfully regenerated, that is its initial activity can be substantially completely restored, by treating it with water or aqueous ammonia and thereafter drying the wet catalyst.

The invention accordingly comprises the novel processes, and steps of processes, specific embodiments of which are described hereinafter by way of example and in accordance with which we now prefer to practice the invention.

Accordingly, the present invention is for a process for the regeneration of an oxidation catalyst containing the oxides of phosphorus and molybdenum, which comprises treating the used catalyst with water or aqueous ammonia and drying the catalyst before reuse.

This treatment of the used catalyst with water or aqueous ammonia can most suitably be effected by removing the substantially water-insoluble used catalyst from the reactor in which it is employed and placing it in a suitable vessel, thereafter soaking or submerging it in the water or aqueous ammonia and ultimately draining off the excess liquid and drying the catalyst, or placing the vessel containing the water and the catalyst in an oven and evaporating off all the water.

The treatment of the catalyst can also be carried out in situ in the reactor if desired.

It has been found that by treating the used catalyst in this way, the activity of the catalyst is substantially completely restored.

The following examples are given to illustrate the process of the present invention.

Example 1

An oxidation catalyst is prepared by dissolving 23.2 grams of ammonium molybdate —$(NH_4)_6Mo_7O_{24}.4H_2O$— in 20 millilitres of water and adding 0.8 gram of phosphorus pentoxide ($P_2O_5$) in the form of phosphoric acid thereto. 20 grams of silica gel are soaked in the above mixture for ½ hour at room temperature, the excess liquid is then drained off, the catalyst dried at 100° C. and finally heated in a stream of air at 320° C. for 1 hour.

This catalyst was used in the production of maleic acid wherein a gaseous mixture comprising air containing 2% by volume of normal butene is passed at the rate of 25 litres per hour over 8 grams of the catalyst at a temperature of 320° C. Initially, of the normal butene fed to the reactor, 26% was converted to maleic acid, but after one week the conversion of the normal butene to maleic acid had fallen to 11%.

This catalyst was removed from the reactor, placed in a basin and covered with water, and the basin was then placed in an oven maintained at 100° C. and the water evaporated off.

On reusing the catalyst regenerated in this way, it was found that the conversion of normal butene to maleic acid was 22%.

Example 2

200 grams of sodium metasilicate are dissolved in 3.5 litres of cold water and to the solution is added aqueous 25% phosphoric acid in amount just sufficient to render the mixture acid to methyl red, and on standing over night silica gel separates. The mixture thus obtained is centrifuged, and the separated gel washed with water. A solution of 50 grams of ammonium molybdate and 12 ml. of 2 N phosphoric acid in 60 ml. of water is added to one-third of the washed hydrated silica gel, and the mixture evaporated to dryness at 100° C. with constant stirring. The friable mass thus obtained is formed in ⅛ inch diameter pellets.

It is found that by passing a gaseous mixture comprising air containing 2% by volume of normal butenes at a rate of 25 litres per hour over 16 grams of this catalyst at a temperature of 320° C., a yield of 30% of maleic acid, based on the amount of normal butene fed to the reactor, is obtained. This yield is maintained for about 280 hours continuous operation, after which the activity of the catalyst gradually declines and after 405 hours continuous operation a yield of 20% of maleic acid, based on the amount of normal butene fed to the reactor, is obtained.

This used catalyst was removed from the reactor, immersed in dilute aqueous ammonia for two minutes, the excess liquid drained off and the catalyst then dried at 90° C.

On reuse of the catalyst thus regenerated in the process described above, the yield of maleic acid obtained, based on the amount of normal butene fed to the reactor, is again 30%.

*Example 3*

When passing a gaseous mixture comprising air containing 1% by volume of normal butene at a rate of 25 litres per hour over 16 grams of a catalyst prepared as described in Example 2, at a temperature of 320° C., a yield of 32% of maleic acid based on the normal butene fed to the reactor is obtained. The yield of maleic acid is maintained above 30% for 800 hours operation.

The used catalyst was removed from the reactor, immersed in dilute aqueous ammonia for two minutes, the excess liquid drained off and the catalyst then dried at 90° C.

On reuse of the catalyst thus regenerated, in the process described above, the yield of maleic acid obtained based on the normal butene fed to the reactor, is again 32%.

We claim:

1. A process for regenerating an oxidation catalyst whose activity has been reduced by use, which comprises, soaking such used substantially water-insoluble catalyst, consisting of the oxides of phosphorus and molybdenum, in a substance selected from the group consisting of water and aqueous ammonia and drying the catalyst to restore its activity at least in part.

2. A process in accordance with claim 1 in which the used catalyst is one supported on a carrier.

3. A process in accordance with claim 2 in which the carrier is silica gel.

References Cited in the file of this patent

UNITED STATES PATENTS

| Number | Name | Date |
|---|---|---|
| 1,863,581 | Miller | July 26, 1932 |
| 2,113,654 | Ipatieff et al. | Apr. 12, 1938 |
| 2,288,395 | Ellis | June 30, 1942 |
| 2,547,380 | Fleck | Apr. 3, 1951 |